Figure 1:
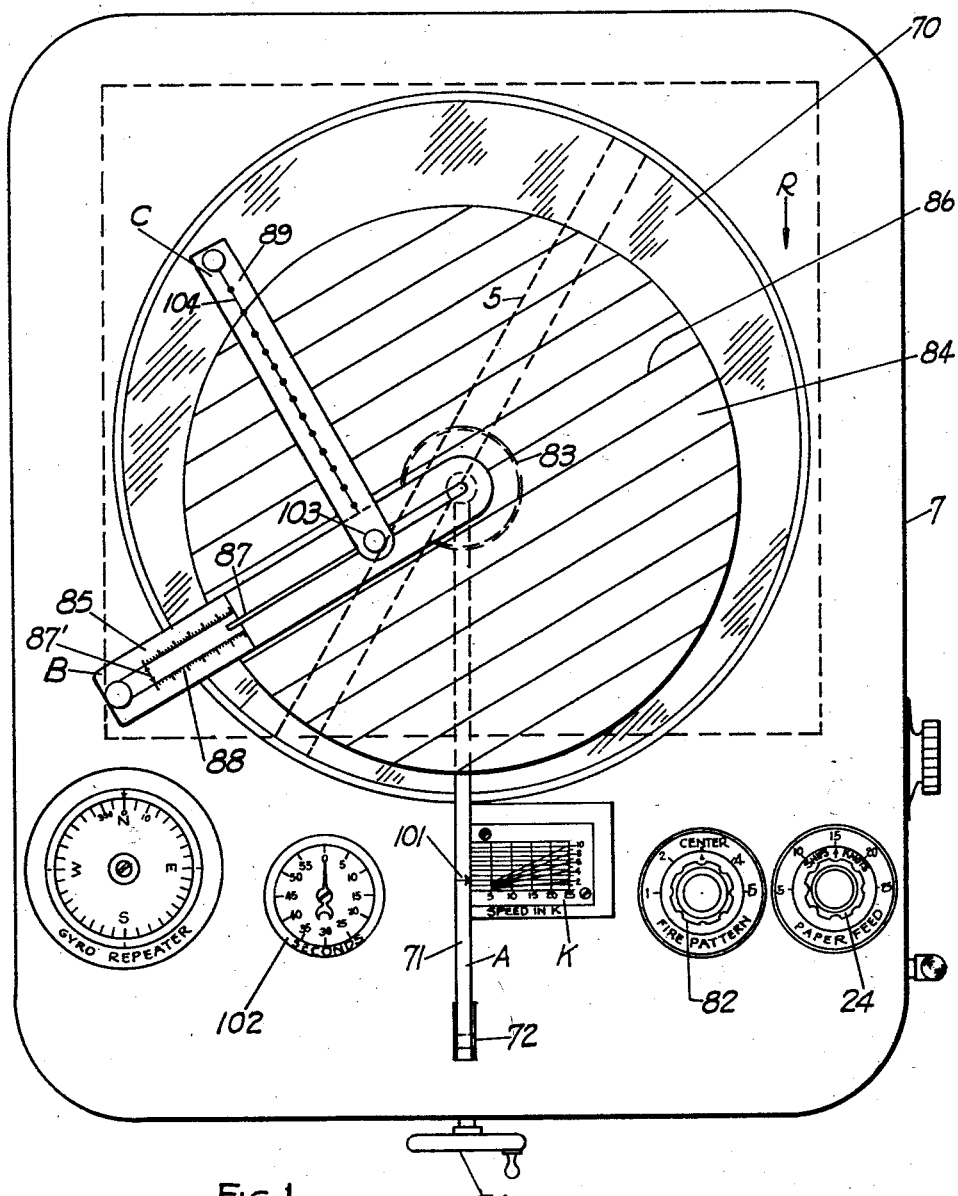

March 9, 1948. R. P. CURTIS 2,437,243
PLOTTING AND COMPUTING DEVICE
Filed Jan. 28, 1942 6 Sheets-Sheet 2

INVENTOR
RICHARD P. CURTIS
BY
ATTORNEY

March 9, 1948. R. P. CURTIS 2,437,243
PLOTTING AND COMPUTING DEVICE
Filed Jan. 28, 1942 6 Sheets-Sheet 4

INVENTOR
RICHARD P. CURTIS
BY
Ezekiel Wolf
ATTORNEY

March 9, 1948.  R. P. CURTIS  2,437,243
PLOTTING AND COMPUTING DEVICE
Filed Jan. 28, 1942   6 Sheets-Sheet 5

INVENTOR
RICHARD P. CURTIS
BY
ATTORNEY

March 9, 1948. R. P. CURTIS 2,437,243
PLOTTING AND COMPUTING DEVICE
Filed Jan. 28, 1942 6 Sheets-Sheet 6

INVENTOR
RICHARD P. CURTIS
BY Ezekiel Wolf
ATTORNEY

Patented Mar. 9, 1948

2,437,243

UNITED STATES PATENT OFFICE 2,437,243

PLOTTING AND COMPUTING DEVICE

Richard P. Curtis, Marblehead, Mass., assignor, by mesne assignments, to Submarine Signal Company, Boston, Mass., a corporation of Delaware Application January 28, 1942, Serial No. 428,592

13 Claims. (Cl. 234—26)

The present invention relates to a computing device for computing courses and speed of known or unknown obstacles in association with directional observations and distance measuring means located on an observing craft to the known or unknown obstacles.

In the companion application of Edwin E. Turner, Jr., Serial No. 377,687, filed February 6, 1941, Patent No. 2,407,330, granted Sept. 10, 1946, a system is disclosed in which a directional transmitter and receiver is operated in connection with a recording device for determining the collision course with a vessel. The present invention is an improvement upon this system and incorporates the features of a distance-measuring element by which the actual course of an observed but unknown vessel can be estimated with only a comparatively few observations.

The present system is particularly useful in many fields and more particularly it is useful for military purposes in charting and plotting the relative course of an enemy submarine with respect to the attacking vessel by means of sound or other wave observations, particularly in planning an attack upon such vessel and setting up a desired relative course of interception.

The invention also will find useful application in navigation purposes and particularly with the use of wave means in air or other media whereby both the direction and distance of an unknown or observed obstacle or vessel may be calculated. In this field the invention may be applied for aircraft navigation and guided and also for surface navigation by vessels during fog or at night. In the present case the observed craft may be a moving object or it may be stationary and may consist of a buoy, a light vessel, lightship or other object.

In its use for observing and plotting the relative course of the submarine, one of the chief merits and advantages of the present invention is that the observing vessel may set and adapt its course accordingly either on a collision-bearing or slightly to one side or the other side of such a collision-bearing, with the ultimate aim of destroying the submarine by depth charges or gun fire or by other means from a desired or chosen point or points where the attack is to occur. For this purpose certain corrections and adaptations are applied to set up very rapidly and to follow through the entire operation of attack, taking into account the speed and depth of the observed submarine and the necessary lags and corrections between the order for firing, the actual firing and the detonation.

Figure 2:
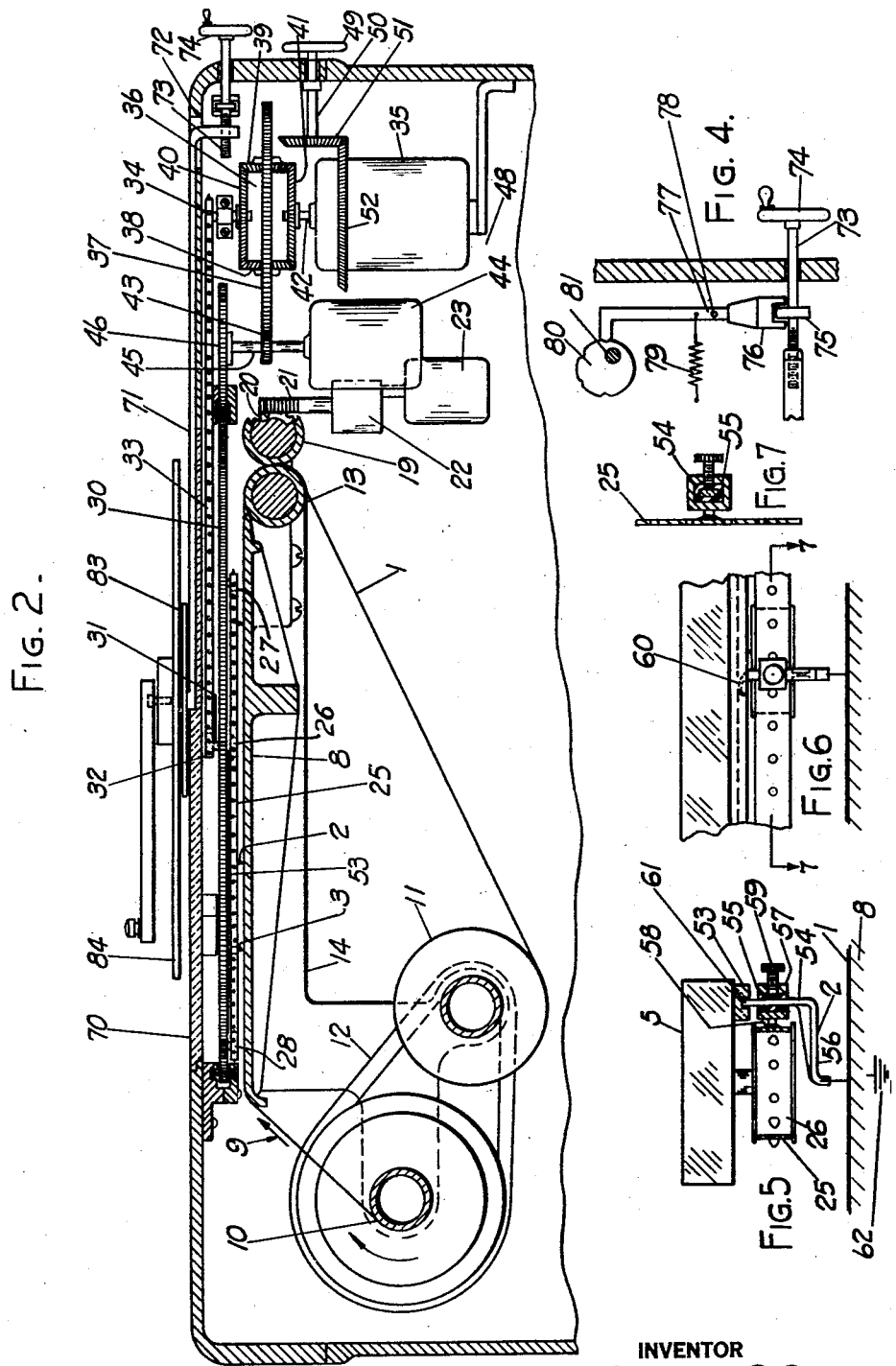
Figure 3:
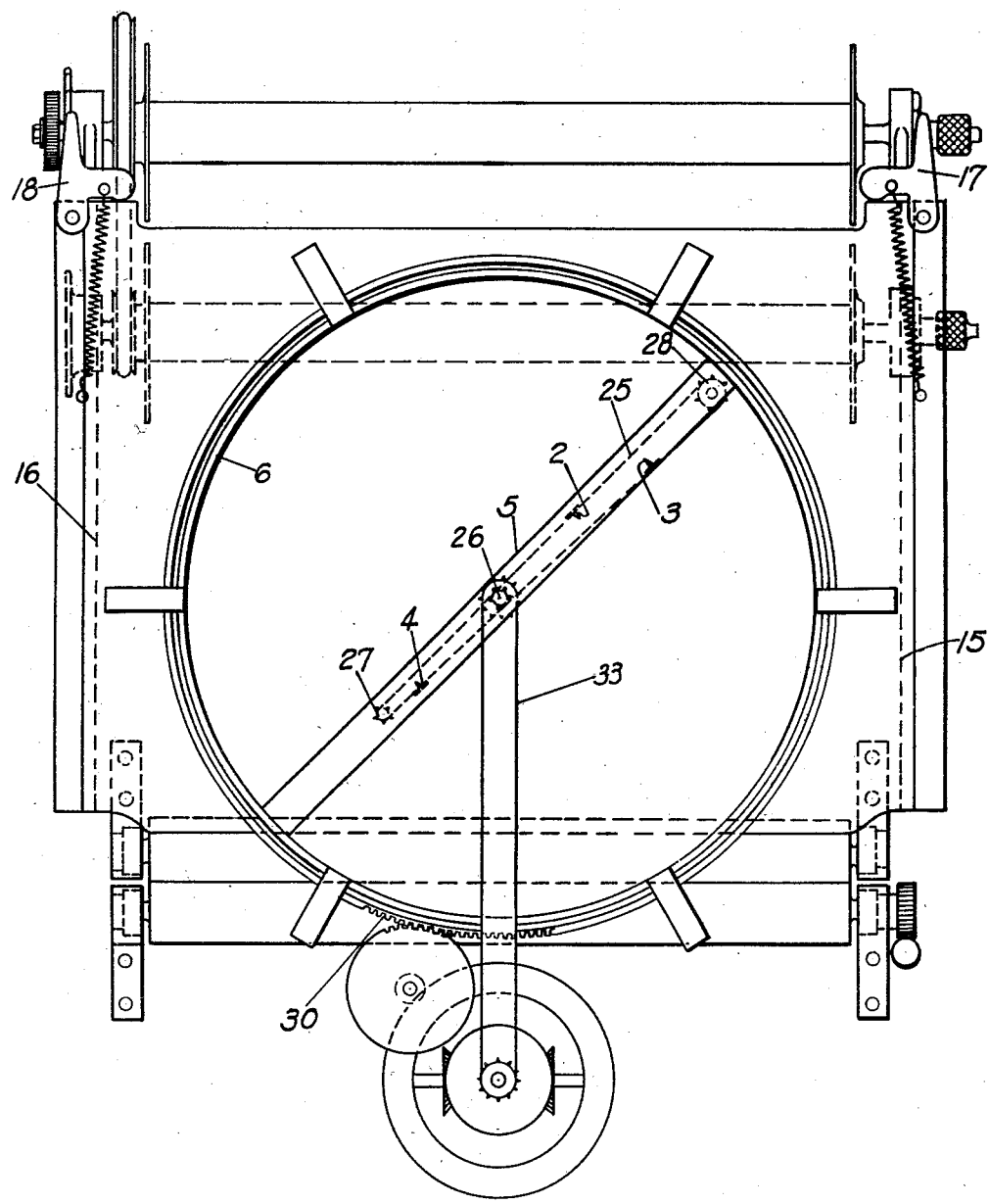
Figure 8:
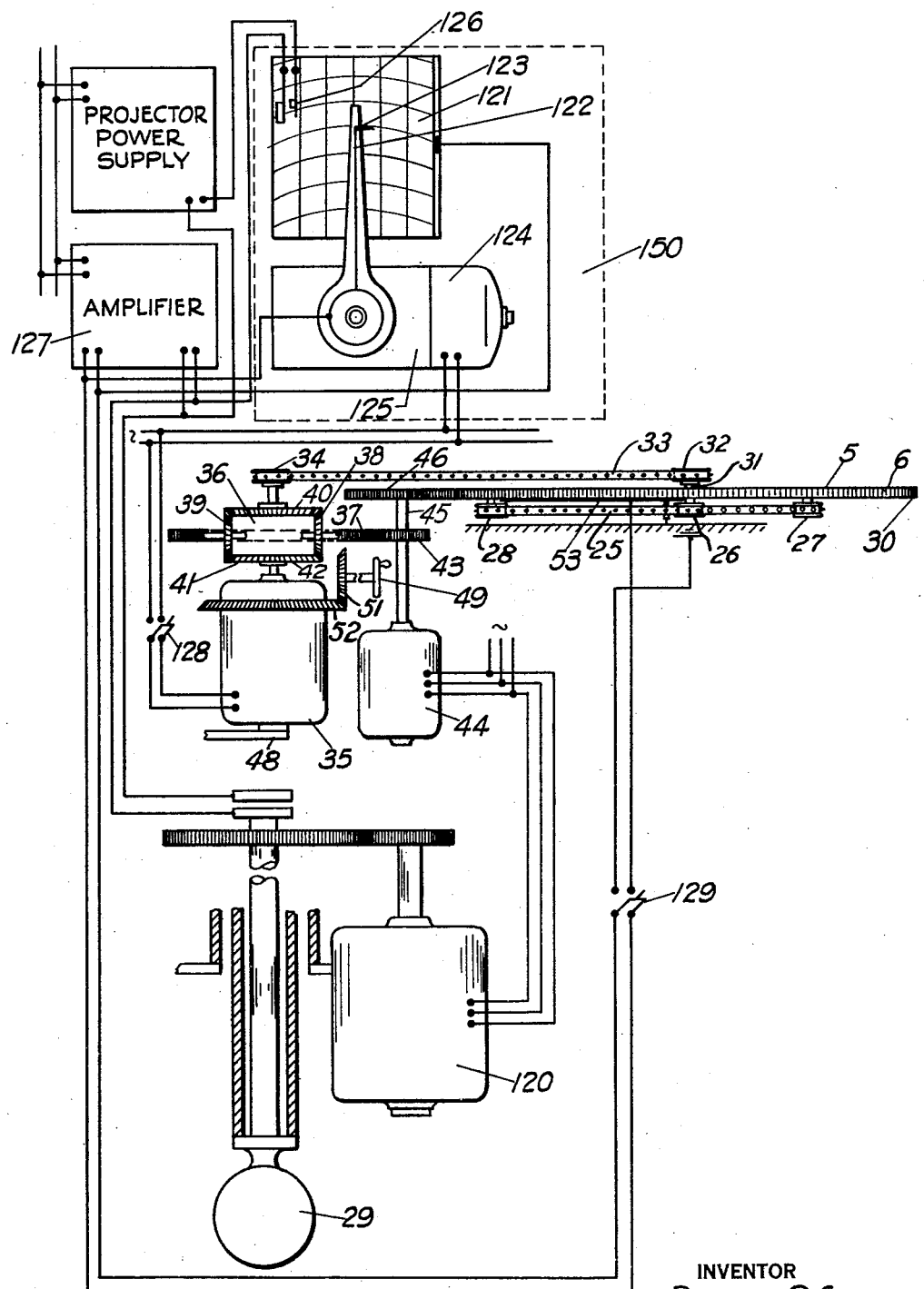
Figure 9:
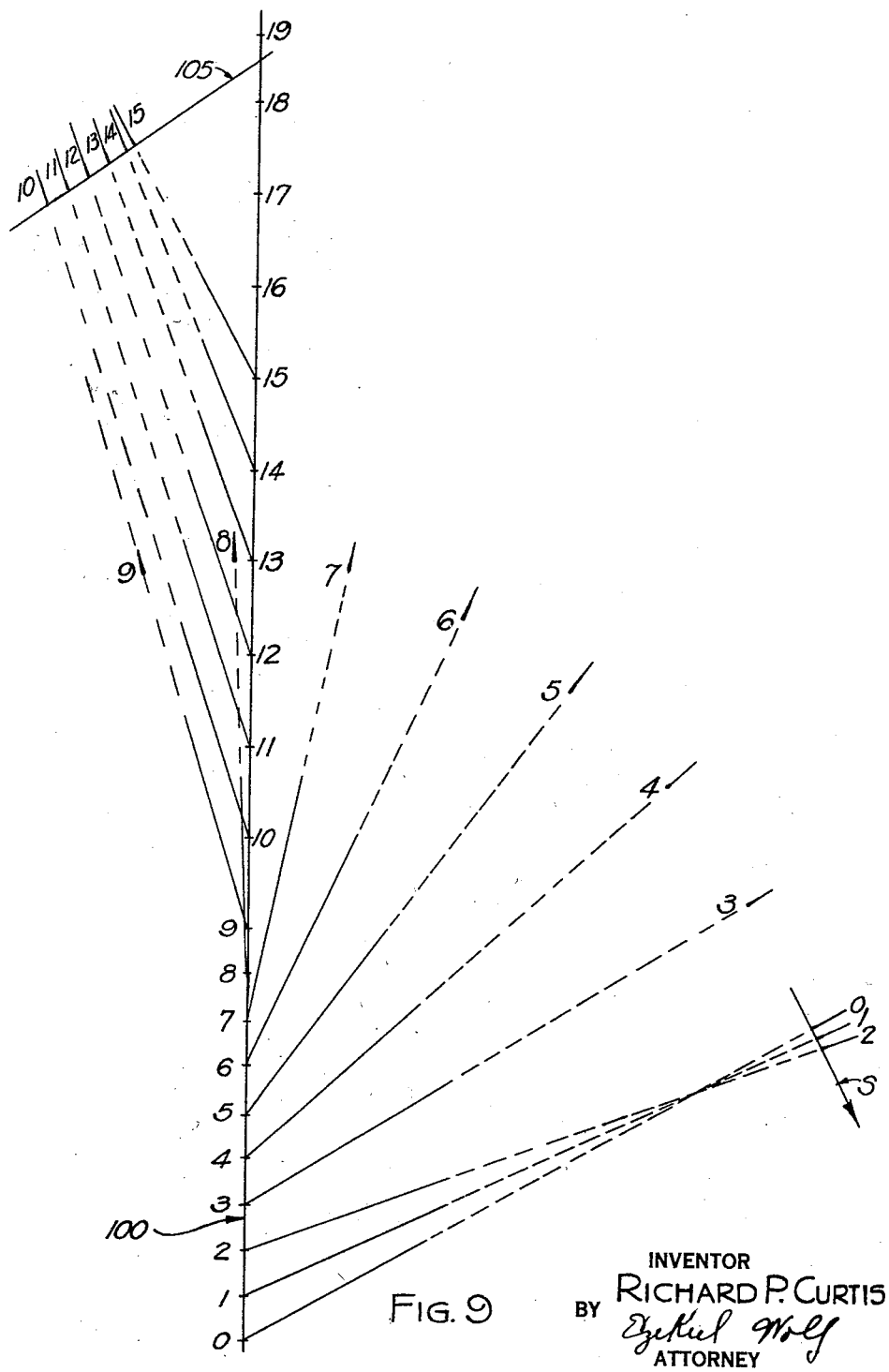
Figures 10, 11:
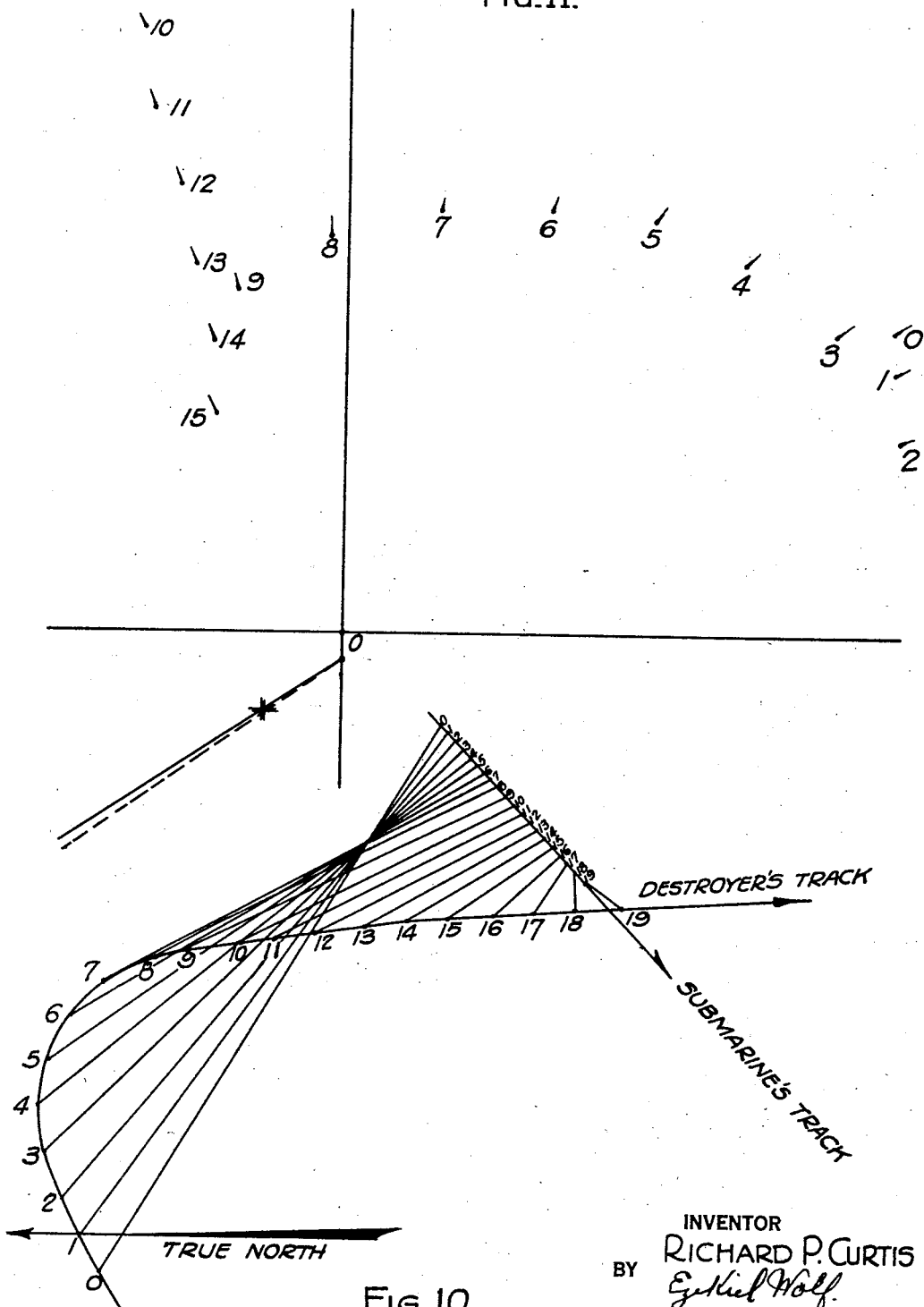

These and other features will be more completely discussed and described in connection with the description of the embodiment of the invention contained in the specification. The drawings, forming a part thereof, show an embodiment of the invention in which Fig. 1 shows a plan view of the indicator and control case; Fig. 2 shows a general longitudinal sectional view of Fig. 1; Fig. 3 shows a plan view of the same structure as Fig. 1 with part of the top cover and computing elements removed therefrom; Fig. 4 shows a detail view illustrating the operation of the mechanism controlling the fire pattern; Fig. 5 shows a detail of the stylus and its operating means; Fig. 6 shows a side view of the element shown in Fig. 5; Fig. 7 shows a sectional view taken approximately along the line 7—7 of Fig. 6; Fig. 8 shows schematically the entire system including the sending and receiving projector; and Figs. 9, 10 and 11 illustrate tactical diagrams for operation of the system in connection with the tracking down of an unknown observed vessel as, for instance, a submarine.

In the system shown in the drawings, the device comprises a constantly fed recording paper 1 which should be fed constantly during the time in which a set of observations is made. This recording paper is marked upon by means of a stylus, three of which are shown in the present system numbered 2, 3 and 4, respectively. These styli record the distance of the observed object, by usual sound ranging methods employing the elapsed time interval between the transmission of a signal and the receipt of an echo, in its proper relative direction from the observing vessel which may, for instance, be a destroyer. The direction on the recording device is established by means of the bridge arm 5 extending diametrically across the ring 6. The arm 5, through the mechanism, which will be described later, is always maintained in the same direction as the projector or wave-directional device 29 of Fig. 8 by which a beam of wave energy is sent out and received so that its orientation determines the direction. The record made upon the recording paper, therefore, at any instant from the center of the ring 6 indicates both the direction and distance of the object which has been observed from a position corresponding to that of the projector on the vessel.

In the present system the paper 1 is fed in proportion to the speed of the observing vessel in a direction opposite thereto so that during the travel of the vessel upon a straight line course, for instance, a line on the paper through the center of the ring 6 opposite to the direction of the travel of the recording paper would represent the chart of the ship's course. Therefore, between points on a straight course, the direction of the paper may be assumed as the course of the vessel. When the course of the vessel is changed, then the direction of travel of the paper, from the point of change on, will correspond to the new course which, however, will be different from the course previously established. The direction of the paper, always being that of the vessel, will be at any instant tangent to the vessel's course. A discussion of the use of the apparatus at a later time will indicate clearly how these courses may be set up and determined on the recording paper.

In Figs. 1, 2 and 3, the number 7 indicates the casing in which recording and computing mechanism is contained. The recording paper 1 is fed over a plate 8 in the direction of the arrow 9 from a spool 10 and is wound up upon a spool 11 by means of a spring pulley drive 12 which at all times holds a slight tension upon the paper between the roll 11 and the driving roll 13. The whole mechanism just described is mounted on a frame 14 which is supported in grooves or slides 15 and 16, respectively, formed at the sides of the casing 7. In order to remove the paper and its feeding mechanism as well as the plate 8, all that is necessary is to pull back the detent levers 17 and 18 which are mounted on brackets extending from the casing and which are tensioned against the end of the frame supporting the plate and to pull out the whole paper-feed mechanism. This, of course, is only necessary when the roll of paper has been used up and it is desired to put in a new roll. The paper is fed through the driving roll 13 which, when the mechanism is in place, squeezes the paper against the roll 19 which, in turn, is driven by the gear 20 through the worm 21 and the reduction gear box 22. This gear box is controlled and driven by the motor 23 whose rotation is adjustable electrically in accordance with the paper-feed knob 24 on the top of the casing.

The recording paper 1 is preferably of the conducting type in which an electric current passing from the stylus through the back of the paper where the conductive material is usually contained produces a visual mark upon the paper as, for instance, a black spot either by decomposing or consuming the paper surface directly beneath the point of the stylus at the instant when the current is produced by virtue of the received signal.

In the present system, as indicated more clearly in Fig. 5, three styli 2, 3 and 4 are employed which are so positioned that as one stylus leaves the recording track, the next stylus enters upon it. These three styli are equally spaced upon a sprocket chain 25 which is driven through the center sprocket wheel 26 intermediate between the end sprocket wheels 27 and 28. These sprocket wheels 26, 27 and 28 are freely journaled or pivoted in the supporting arm 5 which is made of "lucite" or other transparent material and which bridges diametrically across the ring 6 on the outer side of which is mounted a ring gear 30. The center sprocket wheel 26 is mounted on and driven through a drive shaft 31, Fig. 8, upon which is mounted a driving sprocket gear 32 which, in turn, is driven by the sprocket chain 33 from the sprocket gear drive 34 mounted in the forward end of the casing. The drive shaft 31 is centrally mounted with respect to the ring gear 30 and the ring 6 so that, regardless of the rotation of the ring 6, this shaft will remain in its central axial position. The sprocket gear 34 is driven by the motor 35 which may operate synchronously with a distance-measuring indicator 150 by making the motors 124 and 35 synchronous motors and using the same alternating current sources, or which may be controlled to produce a stylus speed so that distances recorded from the center of the ring 6 out to the point where the paper is marked will give a proportionate record of the distance that the observed object is away from the observing vessel. For instance, if the radius of the arm 5 from its center out to the center of the sprocket gear 28 should be equal to a distance of 2000 yards, then the stylus will have to travel the radial distance in a time comparable to the travel of the wave over that distance.

More specifically in distance measurement in submarine signaling, assuming that the speed of sound in water is approximately 4800 feet a second, the time interval necessary for a sound impulse to travel 2000 yards and return to the observed point will be approximately 2½ seconds, so that the stylus under such conditions will of necessity have to travel from the center out to the end of the radius in 2½ seconds. This fact, therefore, will determine the fixed speed of the motor 35.

In cases, however, where the stylus is to be synchronized with a distance-measuring device 150 independently operable with respect to the present system, it is necessary to provide two additional control elements. One of these control elements is dependent upon the change in position of the ring 6 and the bar 5 carrying the stylus sprocket and the stylus mechanism, and the second is the provision for synchronizing to a zero position the independent recording indicator and the styli on the chain 25. The first provision, that of permitting the bar 5 to be placed in any position depending upon the direction of the observed obstacle, is cared for through the differential gearing 36. A ring gear 37 carries, freely mounted on a shaft supported in the plane of the ring gear, two bevelled gears 38 and 39. These bevelled gears mesh with the bevelled gear 40 driving the sprocket wheel 34. The bevelled gears 38 and 39 on the other side mesh with the bevelled gear 41 which is driven through the shaft 42 by the motor 35. The ring gear 37 meshes with a gear 43 driven by the motor 44. The motor 44 also drives through the same shaft 45, on which the gear 43 is mounted, a second gear 46 which meshes with the ring gear 30 for positioning the ring 6 and the arm 5. The motor 44 may be of the Selsyn or repeater type and always positions the arm 5 in the same direction as the projector, as shown in Fig. 8, by the three wire connection of motors 44 and 120, for indicating the direction of the source of sound or other wave energy projected or received from the object which is being observed. The arm 5, therefore, and the projector always maintain the same bearing and this is controlled through the motor 44 and the gears 46 and 30, which, of course, have a definite ratio to one another. The ratio of the gears 43 and 37 is made exactly the same as the ratio of the gears 46 to 30. In this way, as the arm 5 is changed from one position to the other, the sprocket gear 26 will be rotated through the same angle as the arm 5 without rotation of the shaft 42, so that the position of the shaft 42 with respect to the synchronized indicator, with which it may be run, will not be changed. The effect of rotation of the ring 6 and the arm 5 will be compensated by an equal and opposite movement of the members 43 and 37 which will change the position of the bevelled gears 38 and 39 and permit an angular rotation of the bevelled gear 40 equal to that of the rotation of the arm 5. If the independent distance indicator 150 has been operating, when it is desired to put the stylus into operation, it will be necessary to adjust the zero position of the stylus with respect to the transmission of the signal impulse. This will be accomplished by rotation of the motor 35 upon its bearing 48 by means of the handwheel 49 externally positioned with regard to the casing by which the shaft 50 may be rotated to rotate the gear 51 which meshes with the ring gear 52 mounted upon the outside of the motor. By rotation of the rotor with respect to the stator of the synchronous motor 35 by means of the handwheel 49, the position of the stylus through the differential drive, the sprocket gears and chain 34, 32 and 33, respectively, the sprocket gear 26 and chain 25, may be synchronized so that the wave impulse is sent out at the proper reference point. This reference point is, of course, the effective zero reference point with respect to the indicator stylus. Certain corrections may, of course, be effected to bring this reference point slightly before or later than the zero mark.

Each of the three styli, as it comes underneath the center of the sprocket gear 26, makes a brush contact with an electrical rail 53 mounted on the lower side of the transparent arm 5. The styli 2, 3 and 4 have an upright extending arm 54 around which is an insulating collar 55. These styli are preferably rectangular in cross section as indicated in Fig. 7, the width dimensions of the styli extending in the direction of the sprocket chain 25. This, being in the direction of the travel of the sprocket chain, furnishes additional strength to the styli. The vertical arm 54 of each stylus is joined to a horizontal bracket 56 extending to a point under the center of the sprocket wheel 26 corresponding to the axis of the ring 6. The styli with their insulating collars are mounted in holders 57 which are welded in narrow necks 58 to the sprocket chain 25 so that the holders will not interfere with the rotation of the sprocket chain about the sprocket wheels. Each holder is provided with a set screw 59 by which the stylus is held in place. The stylus may be removed by loosening the set screw 59 and simply drawing the shank 54 of the stylus out from the holder socket. The upper end of the stylus arm or shank 54 is provided with a spring brush element 60 bent back slightly on an arc. This brush portion 60 enters upon the groove 61 in the conducting trolley 53, the electrical circuit through the stylus being completed through the trolley 53, the stylus shank 54 to the paper surface 1 and the plate 8 to a ground connection 62 indicated in Fig. 5.

Provision may be made in the apparatus for using the entire distance of travel of the stylus from the center, out to the end of its radius for a distance equal to 1000 yards, in which case the speed of the stylus will be doubled over that previously recited by suitable speed control of the stylus drive. This may be done by operating the motor at double speed or by using some gearshift mechanism to double the stylus speed. At the same time that the speed of the stylus is doubled, the paper-feed speed must also be doubled for the same vessel speeds. The result of this will be to double the distances on the chart from the zero point on the stylus to the marking point for the same actual plotted distances.

In Figs. 1 and 2 there are shown the elements of the course-computing mechanism which is mounted over the face of the casing directly over the glass or other type transparent window 70. As viewed in Fig. 1, the paper will be traveling in the direction of the arrow R in a relation proportional to the speed of the vessel in the forward direction. Bearing on top of the window is first an arm 71, called the A arm which corresponds practically to the ship's course, which passes to the forward end of the casing where it turns at a right angle into the casing through an opening 72. The end of this arm is threaded to receive a screw 73 which is advanced or retracted by means of the handwheel 74. Mounted in a fixed position on the shaft of the screw 73, Fig. 4, is a collar 75 over which rides a yoke 76 at the end of a lever 77 pivoted at 78 and held in position by means of the spring 79. A cam 80 mounted eccentrically on the shaft 81, upon which the fire-pattern knob 82 is mounted, controls the other end of the motion of the lever 77. By rotation, therefore, of the fire-pattern knob 82 the eccentric cam 80 is rotated and the arm 71 advanced or retracted according to the desired fire pattern. In addition to this correction the arm 71 is also moved by means of rotation of the handwheel 74 to advance or retard it. This correction is a correction applied for the firing of the depth charge or other device fired in accordance with various correction factors to be applied to the firing system. The arm 71 carries a small platform 83 upon which is rotatably mounted a transparent disc 84 having attached in fixed position thereto a rule or scale 85 which may be called the B arm corresponding to the observed vessel's course relative to the ship's course when properly set. The transparent disc 84 may be ruled off in parallel lines 86 equally spaced and parallel to the rule 85. The arm B has sliding in it a bar 87. The end 87' carries an arrow which indicates a definite position with respect to the calibrated scale 88 on the arm B. The slidable bar 87 carries a rotatable arm 89, called the arm C, corresponding to the selected collision course of the observed and observing vessels, which may be graduated as indicated in Fig. 1 in distances equal to one-half the distance between successive parallel lines on disc 84 when the arm C is perpendicular to the arm B.

The operation of the system will be explained in connection with Figs. 9, 10 and 11. Fig. 9 shows the plot of relative positions of an observed submarine from a vessel such as a destroyer or a submarine chaser on the chart paper below the glass window 70, the first mark being zero and progressing in numbers up to 15. The marks 0, 1, 2, etc. . . . 15 on the straight line 100 indicate the position of the recording paper at the instants of the beginning of the time intervals of the successive distance measurements, the marks being made by a stylus as it passed beneath the center of the recording arm 5 in response to operation of the receiver circuit by the direct impulse or by a marking impulse. That is, when the zero point was marked, the zero on the line 100 was beneath the center of the recording arm 5. As the paper traveled downward on the chart as indicated in the drawing in Fig. 1, successive observations were made from the points 2, 3, 4, etc., up to point 15. It should here be kept in mind that the points 0, 1, 2, 3, 4 . . . etc., along the line 100 are marked by a stylus at the beginning of the time intervals representing successive distance measurements, while the points 0, 1, 2, 3, 4 . . . etc., off the line 100 are marked by the same stylus at the ends of said time intervals so that the distances on the chart 0—0, 1—1, 2—2, 3—3, 4—4 . . . etc., represent the distances of the submarine from the destroyer at the times of the successive observations. It will be noted that the stylus moves relatively rapidly as compared to the paper movement so that the zero mark has not substantially moved before the range is marked. Similarly the directions of the lines joining the points 0—0, 1—1, 2—2, 3—3, 4—4, . . . etc., represent the relative bearings of the submarine with respect to the destroyer since the recording arm 5 which carries the marking stylus is continually being turned by the mechanism above described to bring this about. After the point 9, the chart range was changed from 2000 yards to 1000 yards so that between the points 9 and 10 the paper moved at double the speed and the chart distances from the center of the arm were doubled as indicated by the comparison between the length of the line 9—9 and that of the line 10—10.

The first three observations of the submarine, namely 0, 1 and 2 indicated that the submarine was going in a relative direction opposite to that of the destroyer, namely in the relative direction of the arrow S. Connecting the three points gives the course, and since the order is the reverse for the submarine from that of the destroyer, it is going in the reverse direction. After the observation 2 was made, the destroyer was turned hard to the right to turn the destroyer's course generally in the direction of the submarine. The results of this are indicated upon the successive bearings, 3, 4, 5, 6, 7, 8 and 9. Fig. 10 shows a derived plot of the destroyer's course, the angle of the tangent of the destroyer's track with the observed direction of the submarine being the same in Fig. 10 as in Fig. 9. In other words, Fig. 10 may be derived from Fig. 9. The distances between points on the straight line in Fig. 9 are approximately the same as that on the curved line of Fig. 10, namely, the distance the destroyer has travelled. The direction of the curve in Fig. 10 is obtained by the angle in Fig. 9 between the straight line and the submarine direction indicated by the line 0—0, 1—1, etc. Between the points 7 and 8 it will be evident both from Figs. 9 and 10 that the destroyer's course has been changed from one directed behind the submarine to one directed forward of the submarine in the same general direction of travel. Obviously, then, at about the point 8, the order would be given to steady the course of the ship which will not take effect until approximately at the position 9 which will be approximately a collision course. From the point 9, therefore, the destroyer will travel for the next few observations in a straight course and correspondingly, if the submarine continues to pursue a straight course, the record on the chart will show up in points 10, 11, 12, 13 and 14, which under the circumstances will be a straight line. The arm B in Fig. 1 will then be set parallel to this course with the lines 86 therefore also parallel to the submarine's course.

Before showing how the lead of the destroyer on the submarine should be established on the various computing arms, the setting of the arm 71 or A arm with reference to the dead-time chart K should be explained. Since direction of the submarine on the chart is determined from the projector which is a directional transmitter and receiver, while operation must take place from the stern or spot where the depth charge leaves the vessel somewhere to the rear of the projector, the center pivot of the arm A must be drawn back from the center of the arm 5 a distance corresponding to the distance between the projector and the depth-charge firing spot. This distance is fixed for a particular vessel. The zero of the dead-time chart K is initially therefore placed opposite the indicating arrow 101. Assuming that this has already been done, then the arm A is set for the dead-time firing lag, which is the lag between the order for firing and the actual firing. If this is, for example, six seconds and the speed of the vessel is 18 knots, then the arrow 101 is advanced from the zero line on the dead-time chart to the intersection of the vertical 18-knot line and the inclined 6-second line. The order for firing will thereby be given a certain distance in advance of the arrival of the destroyer at the chosen spot.

The next element to be established is the necessary lead of the destroyer to permit the depth charge to act at the proper time in the neighborhood of the submarine. This lead on the submarine in its course must be such as to allow for the dead time of firing and the descent of the depth charge to the proper chosen depth when the submarine arrives at the spot. If the depth of the submarine is estimated at 300 feet and this corresponds to a descent time of 43 seconds, then the total lead time is 49 seconds. The distance that the submarine will travel in 49 seconds is determined from the record on the chart. For instance, time may be marked from the point 10 as the destroyer steadies to a comparatively straight course. If the distance from points 10 to 14 corresponds to the 49 seconds as noted on the sweep second clock 102, then this distance is set up by bringing the center 103 of the arm C backwards along the slidable scale 87 the same amount. Since the calibrated arm B or 85 carrying the rule or bar 87 is kept in the direction of the submarine's course, drawing the center 103 of the arm C away from the center where the arm B is pivoted, which is the point corresponding to the firing spot on the destroyer, sets up the necessary lead which the destroyer must establish on the submarine's course.

The arm C is then directed with its center line 104 upon an observed point at the instant it was made. In fact, this should be done before the correction is applied to the center 103 of the arm and will indicate to which side of the collision course the submarine is actually tracking. As shown in Fig. 10 the trend of the plot of these points 5, 6 and 7, when they were first made, was to bear off slightly to the right, looking in the direction of the course of the destroyer, of the corrected center, the point at which the destroyer must fire, indicating the submarine was crossing ahead of the destroyer's course. The course of the destroyer would, therefore, be changed a slight amount to the right, at the same time that the arm B was moved about the same amount to the left, maintaining the same relative picture. At the time of the observation of the point 15 on the chart it may be assumed that these corrections were made and that the arm C was properly corrected for the 49-second lead to be taken by the destroyer. It may then be, as indicated in Fig. 10, that when the point 15 was observed, there was a trend slightly of the submarine to the left of the corrected center so that a change in course of a slight amount to the left would be necessary with a corresponding resetting of the arm C and the arm B. Assuming, however, that the point 15 was the last point which could be observed because the range was getting too short and reflections from the submarine were not easily observed, then the sequence of firing will be determined from these last settings. When the line 105, Fig. 9, of the observed points 10 to 15 moves down under the arm B and comes under the center of the arm B, then the time for firing has arrived. After the last observation was made, the fire-pattern knob 82, which was set to center, will be turned to 1 for the firing of the first charge. This, as explained previously, will move the arm A forward a slight amount so that the line 105 will arrive under the center of the arm B slightly before the time it would have arrived with the knob set at center. After the order to fire has been given with the knob set at 1, the knob is immediately turned to 2 bringing backwards the arm A and therefore the arm B so that the line 105 will have to travel a slight space until it again comes under the center of the arm B. At this point the second firing will occur. The fire-pattern knob 82 is then moved successively to center 4 and 5 to give the time of firing for these three positions.

Fig. 10 shows the actual course of the destroyer, as labelled by the legend "Destroyer's track" corresponding to the straight-line course 100 in Fig. 9. The points along the line 100 of Fig. 9 also correspond to the same points on the destroyer's track. The points on the line marked "Submarine's track" in Fig. 10 correspond to the other points on the record of Fig. 9 not on the line 100. In Fig. 11 there is shown a plot of the observations from the destroyer of the submarine under the conditions indicated in Fig. 10 except that in Fig. 11 the chart paper is kept stationary. Fig. 11, therefore, corresponds to the position of the submarine at the instant the observation is made, namely the lines 0,0, 0,1, 0,2, etc., measure both the distance and indicate the direction of the submarine at the instant the observation was made with reference to the position of the observing vessel in space whether one or both of the vessels are moving. A study of Figs. 9, 10 and 11 shows that under ordinary conditons the desired collision course can easily be established for the destroyer. Since usually the attacking speed of the destroyer is constant, the only change which may take place is through the control of the destroyer's course. The first few readings on the chart will definitely establish the general change to be made in the destroyer's course. If the readings appear as indicated in Fig. 9, namely that the submarine's track is on the right in a general opposite direction from that of the destroyer, the operator will know that the destroyer must be headed around until the submarine is observed to the left of the center line of the chart. The destroyer's track and the submarine's track will then be as indicated in Fig. 10 between the points 9 and 10. From this position the course of the destroyer must be carefully balanced as explained above. If the submarine's track first appeared to be proceeding upwardly on the paper, then the destroyer's initial track would be approximately correct. The proper procedure in this case would be to keep the submarine on the right side of the chart in Fig. 9. In each case the arm B will be placed parallel to the submarine's course and the arm C will have its center line placed over an observation at the instant it was recorded. If the arm C bears generally in the correct direction, the successive observations will fall closely along the center line of the arm C as the distance between the destroyer and the submarine becomes less. In effect, the arm C indicates the collision course for a point moving with the destroyer but to the rear of it, namely a point corresponding to a distance behind the destroyer where the submarine will cross the destroyer path. This distance is assumed to contain, among other corrections, the large correction factor involving the depth of the submarine which establishes the time interval necessary for the depth charge. If, for instance, a depth of 100 feet would correspond to a sinking time of 14 seconds, then the center 103 of the rule C will be withdrawn a much shorter distance than for the 43 seconds previously mentioned. In that case, therefore, the collision path will be set for a point not as far behind the destroyer as in the case where a longer sinking time is established.

Figs. 9, 10 and 11 show a straight-line course for the submarine. Obviously the submarine, when it detects the presence of an enemy vessel, will attempt some manoeuver to avoid having the destroyer come over its position. Knowing, however, the ship's course itself, the trace of the submarine will be readily reflected in its plot upon the chart, and when once a collision course has been established, it will become plainly evident in what manner the submarine is avoiding this collision course by the amount which the record of successive plots at their instant of plotting varies from the previously established collision-line course. As the submarine changes its course and speed, the observer on the vessel will correspondingly change his course so as to maintain the established collision course with the submarine up to the point where the submarine is within the firing range.

In Fig. 8 the system is illustrated as operating with a projector or wave-directive device 29 which may be rotated by a self-synchronous motor 120 which may have some torque-amplifying device contained therein. This self-synchronous motor, which may be of the Selsyn type, is driven synchronously with the motor 44 (see Fig. 2). Both the motors 44 and 120 may be geared with the same gear ratio so that the arm 5 and the projector 29 maintain the same relative position. The operator of the device indicated in Fig. 1 may, if desired, be provided with a repeater, repeating the position of the projector 29 so that the proper synchronism of the two motors may be obtained. The two systems, however, may be run continuously in synchronism without the recording device being operated. The recording device of Fig. 2 may be operated in connection with a paper-recording indicator 150 as shown in Fig. 8. In this case the indicator may be of the usual type comprising a traveling recording paper 121 over which a recording arm 122 carrying a stylus 123 rotates. The arm 122 may be driven by a motor 124 through a reduction gear 125 providing the same reduction as in the system for driving the styli 2, 3 and 4. As the arm 122 passes over the zero mark, it may operate a keying contact 126 for keying the projector 29 and transmitting signal. This zero point will correspond to the zero point of the styli 2, 3 and 4 so that as each of the styli 2, 3 and 4 moves over the zero or center point of the scale, the arm 122 will momentarily close the contacts 126 to transmit a signal from the projector 29. This signal after reflection from the object to be observed, as, for instance, a submarine, may again be picked up by the projector 29 and transmitted through the amplifier 127 to both the stylus 123 and either of the styli 2, 3 and 4 corresponding to the cycle in which the transmission was made.

The independent recording indicator 150 may, of course, be operated without the recording and computing device. In this case the switches 128 for the stylus-drive motor 35 will be open and also, if desired, the switch 129 for the styli 2, 3 and 4.

If the independent recording indicator has been running when it is desired to use the computing system, the switches 128 and 129 may be closed and the zero mark of the styli 2, 3 and 4 be noted. If these marks fail to come at their zero, then the handwheel 49 will be turned which will orient the rotor with respect to the stator so as to bring the motor 35 in the desired synchronism with the arm 122.

It will be obvious from the discussion above that variations may be made in the construction of various elements in the system and that the present system may be applicable for observations by any means of providing distance and direction measurements, particularly simultaneous distance and direction measurements. The primary demand of the present system is that the distance and direction of the observed object be noted. However, the present invention is particularly useful in submarine signaling in the detection of unknown submarines by obtaining echoes and reflections by means of supersonic waves and thereby determining both direction and distance simultaneously. In this field the present invention has particular merit and application.

Having now described my invention, I claim:

1. In a system for tracking and computing the course of an object from an observing craft, means for recording the distance and direction of the object from the observing craft on a recording paper comprising a stylus-carrying bar, means rotatably mounting said bar for rotating the same about a point on said paper, a plurality of sprocket wheels and a belt mounted on said arm, one of said sprocket wheels being mounted at the axis of rotation of said bar, stylus means carried by said sprocket belt and means driving said sprocket wheel at the axis of said bar at a rate whereby said stylus means moves over said recording paper amounts corresponding to the distance of the observed object from said axis and means for moving said recording paper at a rate corresponding to the rate of movement of the observing craft.

2. In a system for tracking and computing the course of an object from an observing craft, means for recording the distance and direction of the object from the observing craft on a recording paper comprising an annular plate element with a diametrical bar member, a plurality of sprocket wheels mounted for free rotation on said diametrical bar member with one of said sprocket wheels at the diametrical center thereof, a sprocket belt carried by said sprocket wheels and having stylus elements projecting therefrom adapted to contact the recording paper, means for driving said center sprocket wheel for moving said stylus means outward from said center at speeds corresponding to the distance that the observed object is from the craft in the direction of the diametrical arm whereby the distance which the stylus has traveled in such direction marks the distance of the object from the observing craft and means for moving said recording paper at a rate corresponding to the rate of movement of the observing craft.

3. In a system for tracking and computing the course of an object from an observing craft, means for recording the distance and direction of the object from the observing craft on a recording paper comprising an annular plate element with a diametrical bar member, means for rotating said annular element to maintain said bar member in the direction of the object being observed, a plurality of freely rotatable sprocket elements with one thereof located at the diametrical center of said annular element, a sprocket belt having a stylus element thereon supported for movement by said sprocket elements, means driving said center sprocket element with a sprocket wheel and belt drive, said sprocket wheel being located and supported independently of said annular element and means driving said last sprocket wheel comprising a driving source and a differential system acting intermediately between said last sprocket wheel and said driving source.

4. In a system for tracking and computing the course of an object from an observing craft, means for recording the distance and direction of the object from the observing craft on a recording paper comprising an annular plate element with a diametrical bar member, means for rotating said annular element to maintain said bar member in the direction of the object being observed, a plurality of freely rotatable sprocket elements with one thereof located at the diametrical center of said annular element, a sprocket belt having a stylus element thereon supported for movement by said sprocket elements, means driving said center sprocket element with a sprocket wheel and belt drive, said sprocket wheel being located and supported independently of said annular element, means driving said last sprocket wheel comprising a driving source and a differential system acting intermediately between said last sprocket wheel and said driving source, and means driving said annular element including a gear-changing means applying the same gear-changing ratio to said differential means.

5. In a system for tracking and computing the course of an object from an observing craft, means for recording the distance and direction of the object from the observing craft on a recording paper, comprising an arm element adapted to be rotated about a point over said recording paper, said arm carrying a plurality of sprocket wheels with one thereof located at the center of rotation, a sprocket chain supported by said sprocket wheels, a stylus member carried by said chain having a stylus point bearing on said recording paper and an electrical contact element bearing against a conducting plate, said conducting plate being mounted on said arm, and means mounted externally of said arm for driving the center sprocket wheel at a speed to cause such stylus to move across said paper whereby the marking on said paper made by the stylus will correspond to the distance of the observed object from the observing craft.

6. In a system for tracking and computing the course of an object from an observing craft, means for recording the distance and direction of the object from the observing craft on a recording paper, comprising an arm element adapted to be rotated about a point over said recording paper, said arm carrying a plurality of sprocket wheels with one thereof located at the center of rotation, a sprocket chain supported by said sprocket wheels, a stylus member carried by said chain having a stylus point bearing on said recording paper and an electrical contact element bearing against a conducting plate, said conducting plate being mounted on said arm, means mounted externally of said arm for driving the center sprocket wheel at a speed to cause such stylus to move across said paper whereby the marking on said paper made by the stylus will correspond to the distance of the observed object from the observing craft, a differential device connected to the driving means, and means for adjustably actuating said device to vary the motion of the driving means.

7. In a system for tracking and computing the course of an object from an observing craft, means for recording the distance and direction of the object from an observing craft on a recording paper comprising an arm mounted for rotation over said recording paper about an axis perpendicular thereto, a plurality of supporting pulleys mounted on said arm, said pulleys supporting a stylus belt with a stylus carried thereby and adapted to mark on said recording paper, one of said pulleys being mounted at said center and means supported externally of said arm for driving the pulley at said center whereby the stylus moves outward from said center at a rate adaptable to measure the distance of the object from the observed craft by the instantaneous position of the stylus and means for moving said recording paper at a rate corresponding to the rate of movement of the observing craft, and means for conducting electrical impulses to the stylus as it moves radially outward from said center corresponding to the indication received from the object being observed.

8. In a system for tracking and computing the course of an object from an observing craft wherein a record is made of the direction and distance of the object from successive points forming a line, the points corresponding to the position at any instant of the observing vessel, an arm positioned over said recording paper pivoted over a spot in said line and adapted to be placed parallel with the observed course of the object and a second arm pivoted on an axis on said first arm adapted to be placed in the direction of the desired course of interception of the object and the observing craft.

9. In a system for tracking and computing the course of an object from an observing craft wherein a record is made of the direction and distance of the object from successive points forming a line, the points corresponding to the position at any instant of the observing vessel, means positioned over said recording paper pivoted over a spot in said line, said means comprising an arm adapted to be placed parallel with the observed course of the object, a second arm pivoted on an axis on said first arm adapted to be placed in the direction of the desired course of interception of the object and the observing craft, and means rotatably supporting the whole assembly, said means being adapted to be moved along the record in the line of motion of the observing craft.

10. In combination, in a system for tracking and computing the course of an object from an observing craft, means for plotting the observed course of the object from the observed craft on a recording sheet moving at a velocity corresponding to that of the observing craft, said course being plotted from a point corresponding to the position of the observing craft, means positioned over said recording paper comprising a support adapted to be moved in the direction of motion of said paper, an arm pivotally mounted thereon adapted to be placed parallel to the course of the object and a second arm pivotally mounted and laterally adjustable along said first arm adapted to be placed in the desired relative course of interception of the object and the observing vessel.

11. In combination, in a system for tracking and computing the course of an object from an observing craft, means for plotting the observed course of the object from the observed craft on a recording sheet moving at a velocity corresponding to that of the observing craft, said course being plotted from points corresponding to the position of the observing craft, means positioned over said recording paper comprising a support adapted to be moved in the direction of motion of said paper, an arm pivotally mounted thereon adapted to be placed parallel to the course of the object, a second arm pivotally mounted and laterally adjustable along said first arm adapted to be placed in the desired relative course of interception of the object and the observing vessel, and means for moving said supporting means calibrated distances corresponding to a chosen firing lag.

12. In combination, in a system for tracking and computing the course of an object from an observing craft, means for plotting the observed course of the object from the observing craft on a recording sheet moving at a velocity corresponding to that of the observing craft, said course being plotted from a point corresponding to the position of the observing craft, means positioned over said recording paper comprising a support adapted to be moved in the direction of motion of said paper, an arm pivotally mounted thereon adapted to be placed parallel to the course of the object, a second arm pivotally mounted and laterally adjustable along said first arm adapted to be placed in the desired relative course of interception of the object and the observing vessel, said laterally adjustable arm being adapted to be set a time interval corresponding to the total firing lag.

13. In combination, in a system for tracking and computing the course of an object from an observing craft, means for plotting the observed course of the object from the observing craft on a recording sheet moving at a velocity corresponding to that of the observing craft, said course being plotted from a point corresponding to the position of the observing craft, means positioned over said recording paper comprising a support adapted to be moved in the direction of motion of said paper, an arm pivotally mounted thereon adapted to be placed parallel to the course of the object, a second arm pivotally mounted and laterally adjustable along said first arm adapted to be placed in the desired relative course of interception of the object and the observing vessel, said laterally adjustable arm being adapted to be set a time interval corresponding to the total firing lag, and means further adjusting said supporting means along the direction of said support in accordance with the chosen pattern for firing a charge to destroy said object.

RICHARD P. CURTIS.

REFERENCES CITED

The following references are of record in the file of this patent:

UNITED STATES PATENTS

| Number | Name | Date |
|---|---|---|
| 1,666,943 | Mouton | Apr. 24, 1928 |
| 1,943,403 | Watson | Jan. 16, 1934 |
| 2,066,498 | Watson | Jan. 5, 1937 |
| 1,891,502 | Sayre | Dec. 20, 1932 |
| 2,224,182 | Crooke | Dec. 10, 1940 |
| 1,677,944 | Williams | July 24, 1928 |
| 1,785,307 | Hammond | Dec. 16, 1930 |
| 2,167,124 | Minton | July 25, 1939 |
| 2,046,843 | Prescott et al. | July 7, 1936 |
| 1,084,907 | Spalazzi | Jan. 20, 1914 |
| 1,123,795 | Pollen et al. | Jan. 5, 1915 |
| 1,293,747 | Ford | Feb. 11, 1919 |
| 1,348,855 | Fessenden | Aug. 10, 1920 |
| 1,782,294 | Florisson | Nov. 18, 1930 |
| 1,433,595 | Baule | Oct. 31, 1922 |
| 1,151,293 | Sawyer | Aug. 24, 1915 |